United States Patent
Katayama et al.

(10) Patent No.: US 10,900,926 B2
(45) Date of Patent: Jan. 26, 2021

(54) GAS SENSOR, GAS DETECTION APPARATUS, FUEL CELL POWERED VEHICLE, AND MANUFACTURING METHOD OF GAS SENSOR

(71) Applicant: Panasonic Intellectual Property Management Co., Ltd., Osaka (JP)

(72) Inventors: Koji Katayama, Nara (JP); Zhiqiang Wei, Osaka (JP); Shunsaku Muraoka, Osaka (JP); Kazunari Homma, Kyoto (JP)

(73) Assignee: PANASONIC SEMICONDUCTOR SOLUTIONS CO., LTD., Kyoto (JP)

( * ) Notice: Subject to any disclaimer, the term of this patent is extended or adjusted under 35 U.S.C. 154(b) by 233 days.

(21) Appl. No.: 16/250,330

(22) Filed: Jan. 17, 2019

(65) Prior Publication Data
US 2019/0154627 A1  May 23, 2019

Related U.S. Application Data

(63) Continuation-in-part of application No. PCT/JP2018/027231, filed on Jul. 20, 2018.

(30) Foreign Application Priority Data

Sep. 4, 2017 (JP) ................... 2017-169614

(51) Int. Cl.
*G01N 27/12* (2006.01)
*H01M 8/04* (2016.01)
(Continued)

(52) U.S. Cl.
CPC ....... *G01N 27/4075* (2013.01); *B60K 15/035* (2013.01); *B60K 15/063* (2013.01);
(Continued)

(58) Field of Classification Search
CPC .. G01N 27/00; G01N 27/04; G01N 27/12–16; G01N 27/125; G01N 27/40;
(Continued)

(56) References Cited

U.S. PATENT DOCUMENTS

| 4,908,118 A * | 3/1990 | Ammende ......... G01N 27/4074 204/421 |
| 2013/0186178 A1 | 7/2013 | Usagawa |

(Continued)

FOREIGN PATENT DOCUMENTS

| JP | S59-058348 A | 4/1984 | |
| JP | 61118651 A * | 6/1986 | ............. G01N 27/12 |

(Continued)

OTHER PUBLICATIONS

J. Yu et al., "Hydrogen gas sensing properties of Pt/Ta2O5 Schottky diodes based on Si and SiC substrates", Sensors and Actuators A 172, 2011, pp. 9-14.
International Search Report dated Oct. 16, 2018 in International Application No. PCT/JP2018/027231.

*Primary Examiner* — Nguyen Q. Ha
(74) *Attorney, Agent, or Firm* — McDermott Will & Emery LLP

(57) ABSTRACT

A gas sensor includes: a first electrode; a metal oxide layer that is on the first electrode and has a resistance value that changes when the metal oxide layer contacts hydrogen atoms; a second electrode on the metal oxide layer; and an insulating film that covers at least a part of side surfaces of the first electrode, the metal oxide layer, and the second electrode. In the metal oxide layer, a part of a first interface between the first electrode and the metal oxide layer is not covered by the insulating film and is exposed to a gas.

19 Claims, 16 Drawing Sheets

(51) Int. Cl.
*G01N 27/407* (2006.01)
*B60L 50/70* (2019.01)
*B60K 15/035* (2006.01)
*B60K 15/063* (2006.01)
*H01M 8/00* (2016.01)

(52) U.S. Cl.
CPC ............ *B60L 50/70* (2019.02); *G01N 27/125* (2013.01); *H01M 8/00* (2013.01); *H01M 8/04* (2013.01); *B60Y 2400/102* (2013.01)

(58) Field of Classification Search
CPC ........ G01N 27/406–409; B60K 15/035; B60K 15/063; B60L 50/70; B60Y 2400/102; H01M 8/00; H01M 8/04
See application file for complete search history.

(56) References Cited

U.S. PATENT DOCUMENTS

| | | |
|---|---|---|
| 2013/0250658 A1 | 9/2013 | Wei et al. |
| 2017/0131227 A1 | 5/2017 | Homma et al. |

FOREIGN PATENT DOCUMENTS

| | | | |
|---|---|---|---|
| JP | 2005331364 A | * 12/2005 | ............ G01N 27/127 |
| JP | 2006112894 A | * 4/2006 | ............ G01N 27/127 |
| JP | 2007-163253 A | 6/2007 | |
| JP | 5352032 B2 | 11/2013 | |
| JP | 6145762 B1 | 6/2017 | |
| JP | 2018-124170 A | 8/2018 | |
| WO | 2012/043071 A1 | 4/2012 | |
| WO | 2013/051267 A1 | 4/2013 | |

* cited by examiner

GAS SENSOR, GAS DETECTION APPARATUS, FUEL CELL POWERED VEHICLE, AND MANUFACTURING METHOD OF GAS SENSOR

CROSS REFERENCE TO RELATED APPLICATIONS

This application is a continuation-in-part of PCT International Patent Application Number PCT/JP2018/027231 filed on Jul. 20, 2018, claiming the benefit of priority of Japanese Patent Application Number 2017-169614 filed on Sep. 4, 2017, the entire contents of which are hereby incorporated by reference.

BACKGROUND

1. Technical Field

The present disclosure relates to a gas sensor for detecting gas molecules containing hydrogen atoms included in a gas, a gas detection apparatus, and a fuel cell powered vehicle carrying the gas sensor.

2. Description of the Related Art

Recently, efforts toward realization of a hydrogen society have been vigorously made in various fields. Especially, fuel-cell cars using hydrogen as fuel, which are expected to be the ultimate environment-friendly cars, have also been released to the market, and accordingly, infrastructures such as hydrogen stations have also been steadily developed. In such circumstances, the importance of a sensor detecting hydrogen is increasing as what guarantees the safety and security of the hydrogen society.

For example, Japanese Unexamined Patent Application Publication No. S59-58348 discloses a gas detector element of the MIM (Metal-Insulator-Metal) structure in which a metal membrane, a gas sensitive resistance film, and a metal membrane are laminated. The gas sensor of Japanese Unexamined Patent Application Publication No. S59-58348 uses, as the gas sensitive resistance film, an insulating film obtained by adding predetermined amounts of palladium (Pd) and glass to tantalum pentoxide ($Ta_2O_5$), and is configured by interposing the gas sensitive resistance film between upper and lower metal electrodes made of platinum (Pt). Japanese Unexamined Patent Application Publication No. S59-58348 describes that the gas sensor can detect the flammable gas including hydrogen (hereinafter referred to as the hydrogen containing gas).

Additionally, "Sensors and Actuators A 172 (2011) 9-14" discloses a gas detector element of the MIS structure formed by laminating a metal, a gas sensitive resistance film, and a semiconductor. The gas sensor of "Sensors and Actuators A 172 (2011) 9-14" is configured by a laminated body of Pt, $Ta_2O_5$, and silicon (Si) or silicon carbide (SiC), and detects a gas including hydrogen atoms. "Sensors and Actuators A 172 (2011) 9-14" describes that the hydrogen containing gas is detected by using the change in the electrical property (for example, the change in the IV characteristic of the MIS (Metal-Insulator-Semiconductor) structure) caused by the reduction of $Ta_2O_5$ of the gas sensitive resistance film by hydrogen atoms dissociated from the hydrogen containing gas by the catalytic action of Pt.

Generally, the higher the temperature is, the higher the efficiency of dissociation of hydrogen atoms from the hydrogen containing gas by the catalytic action of Pt becomes. Thus, heating the gas sensor increases the detection sensitivity. Therefore, in Japanese Unexamined Patent Application Publication No. S59-58348 and in "Sensors and Actuators A 172 (2011) 9-14", a heater is provided adjacent to the gas detector element, and the gas detector element is heated by the heater. For example, Japanese Unexamined Patent Application Publication No. S59-58348 describes that the gas detector element is heated to 400° C., and "Sensors and Actuators A 172 (2011) 9-14" describes that the gas detector element is heated to 100° C. to 150° C.

Conventional gas sensors are heated to 100° C. or more so as to improve the sensitivity for detecting a gas containing hydrogen atoms, and also has a power consumption of about 100 mW at minimum. Accordingly, when the gas sensor is used in an always-ON state, there is a problem that power consumption becomes very high.

The present disclosure provides an apparatus that can sensitively and stably detect gas molecules containing hydrogen atoms, and has a low power consumption.

SUMMARY

In order to solve the above problem, a gas sensor according to an aspect of the present disclosure is a gas sensor that detects molecules of a gas, the gas sensor including: a first electrode; a metal oxide layer on the first electrode, the metal oxide layer having a resistance value that changes when the metal oxide layer contacts hydrogen atoms; a second electrode on the metal oxide layer; and an insulating film that covers at least a part of side surfaces of the first electrode, the metal oxide layer, and the second electrode. In the metal oxide layer, a part of at least one of a first interface between the first electrode and the metal oxide layer, and a second interface between the second electrode and the metal oxide layer is not covered by the insulating film and is exposed to the gas.

A gas detection apparatus according to an aspect of the present disclosure is a gas detection apparatus including: the gas sensor having the features described above; and a power supply circuit that applies a voltage between the first electrode and the second electrode.

A fuel cell powered vehicle according to an aspect of the present disclosure is a fuel cell powered vehicle including: a cabin; a gas tank chamber in which a tank for hydrogen gas is arranged; a fuel cell chamber in which a fuel cell is arranged; and the gas sensor having the features described above. The gas sensor is arranged in at least one of the gas tank chamber and the fuel cell chamber.

A manufacturing method of a gas sensor according to an aspect of the present disclosure is a manufacturing method of a gas sensor that detects molecules of a gas. The manufacturing method includes: forming a first electrode; forming, on the first electrode, a metal oxide layer having a resistance value that changes when the metal oxide layer contacts hydrogen atoms; forming a second electrode on the metal oxide layer; forming an insulating film that covers at least a part of side surfaces of the first electrode, the metal oxide layer, and the second electrode; and forming, in at least a part of the insulating film and the second electrode, an opening that is recessed in a laminating direction of the insulating film, the second electrode, the metal oxide layer, and the first electrode, to expose at least a part of a first interface between the second electrode and the metal oxide layer.

According to the present disclosure, it is possible to provide a gas sensor, etc. that has a low power consumption, and can detect gas molecules containing hydrogen atoms at high speed and stably.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1A:
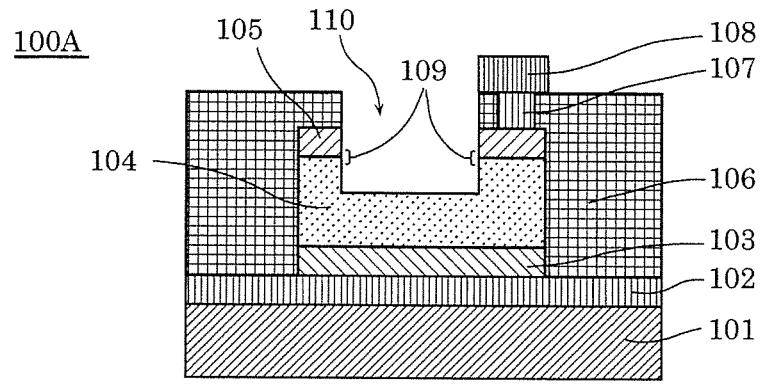
FIG. 1A is a cross-sectional view of a gas sensor according to Embodiment 1.

DETAILED DESCRIPTION OF THE EMBODIMENTS (Knowledge Used as the Basis of the Present Disclosure)

As a result of the inventors' earnest examination, it was found that there are following problems in conventional gas sensors.

In conventional gas sensors, in order to improve the sensitivity for detecting a hydrogen atom-containing gas, an element for detecting the gas is heated to 100° C. or more. Therefore, even the lowest power consumption of the conventional gas sensors is about 100 mW. Accordingly, there is a problem that, when the gas sensor is used in an always-ON state, the power consumption becomes high.

A gas sensor according to one aspect of the present disclosure can sensitively detect a hydrogen atom-containing gas, and has an excellent power saving property.

Hereinafter, embodiments of the present disclosure are described with reference to the drawings.

Note that, in the drawings, the same numerals are assigned to elements with substantially the same configurations, operations, and effects, and a description for such elements is omitted. Additionally, all the numerical values, materials, compositions, shapes, methods for film deposition, and the connecting relationship between components described below are mere illustrations for specifically describing the embodiments of the present disclosure, and the present disclosure is not limited to these. In addition, among the components in following embodiments, those components that are not recited in the independent claim representing the highest concept are described as arbitrary components.

Embodiment 1

[Configuration 1 of Gas Sensor]

A gas sensor according to Embodiment 1 is a gas sensor based on the structure in which electrode layers are laminated on and under a metal oxide layer. The gas sensor is formed such that at least a part of an upper electrode layer on the metal oxide layer is penetrated, so that the interface between the metal oxide layer and the upper electrode layer is exposed, and the gas sensor can detect a hydrogen containing gas without being heating by a heater. Here, the hydrogen containing gas is a general term for a gas consisting of molecules containing hydrogen atoms, and may contain hydrogen, methane, alcohol, etc. as an example.

Figure 1B:
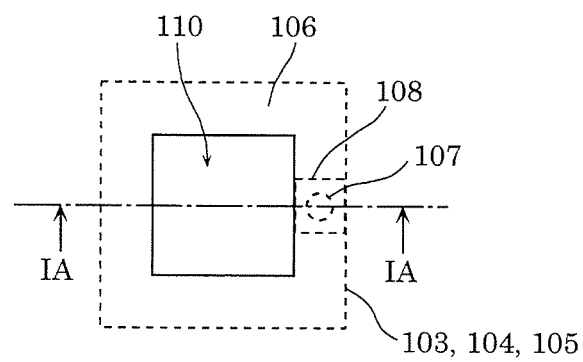
FIG. 1B is a plan view of the gas sensor according to Embodiment 1.

FIG. 1A is a cross-sectional view showing one exemplary configuration of gas sensor 100A according to Embodiment 1. FIG. 1B is a plan view of gas sensor 100A according to Embodiment 1. The cross section of FIG. 1A corresponds to the cross section seen in the direction indicated by arrows in the IA-IA cutout line in FIG. 1B.

Gas sensor 100A includes substrate 101, insulating film 102 formed on substrate 101, first electrode 103 formed above insulating film 102, second electrode 105, metal oxide layer 104 sandwiched between first electrode 103 and second electrode 105, insulating film 106, via 107, and wire conductor 108.

Metal oxide layer 104 is arranged between first electrode 103 and second electrode 105. Metal oxide layer 104 reversibly shifts between a high resistance state and a low resistance state according to the voltage applied between first electrode 103 and second electrode 105, and according to whether or not the hydrogen containing gas exists in the gas to which second electrode 105 contacts.

Via 107 penetrates through insulating film 106 and is connected to second electrode 105 in a portion in which insulating film 106 covers the upper surface of second electrode 105. Wire conductor 108 is arranged on via 107.

Further, opening 110 is provided so as to penetrate through insulating film 106 and at least a part of second electrode 105. As shown in FIG. 1B, opening 110 is a rectangular recessed hollow at a position including the middle of gas sensor 100A in the plane view. As shown in FIG. 1B, insulating film 106 is arranged around opening 110. Note that opening 110 may be provided at a position not including the center of gas sensor 100A in the plane view, and may not be a rectangular shape. Interface 109 at which second electrode 105 and metal oxide layer 104 contact each other is exposed, so as to contact the hydrogen containing gas to be examined. Interface 109 is a first interface.

Figure 1C:
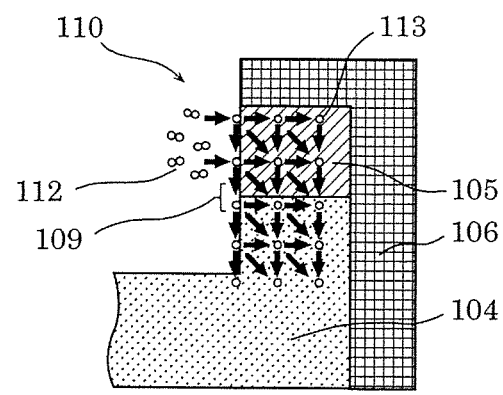
FIG. 1C is an enlarged view of a part of the gas sensor in FIG. 1A.

When second electrode 105 is formed of a metal (for example, Pt) having a catalytic action, as shown in FIG. 1C, gas molecules 112 of the hydrogen containing gas are dissociated into hydrogen atoms 113 in surfaces of second electrode 105 exposed to the side surfaces of opening 110. Additionally, since the side surfaces of second electrode 105 and metal oxide layer 104 are exposed by opening 110, hydrogen atoms 113 dissociated at the side surfaces of second electrode 105 can be easily spread from the surfaces of second electrode 105 to the side surface of metal oxide layer 104, new dissociative reaction in the side surfaces of second electrode 105 easily occurs, and more hydrogen atoms 113 are generated. These hydrogen atoms 113 are spread inside from the surfaces of second electrode 105 or metal oxide layer 104, and a reduction reaction is performed within metal oxide layer 104.

When metal oxide layer 104 is an oxygen-deficient metal oxide, metal oxide layer 104 is chemically unstable, and therefore easily reacts to hydrogen atoms, etc. Thus, it can be expected that a reaction to hydrogen atoms are facilitated.

Note that, in the present disclosure, "the oxygen deficiency level" of a metal oxide refers to the rate of the deficient amount of oxygen in the metal oxide to the amount of oxygen in the oxide of stoichiometric composition composed by the same element as the metal oxide. Further, the deficient amount of oxygen is the value obtained by subtracting the amount of oxygen in the metal oxide from the amount of oxygen in the metal oxide of stoichiometric composition. When a plurality of metal oxides of stoichiometric composition composed by the same element as the metal oxide may exist, the oxygen deficiency level of the metal oxide is defined based on one of those metal oxides of stoichiometric composition with the highest resistance value. The metal oxide of stoichiometric composition is more stable and has a higher resistance value compared with the metal oxides of other compositions.

For example, when a metal is a tantalum (Ta), since the oxide of stoichiometric composition according to above-described definition is $Ta_2O_5$, it can be expressed as $TaO_{2.5}$. The oxygen deficiency level of $TaO_{2.5}$ is 0%, and the oxygen deficiency level of $TaO_{1.5}$ is oxygen deficiency level=(2.5−1.5)/2.5=40%. Additionally, the oxygen deficiency level of an oxygen-excess metal oxide is a negative value. Note that, in this specification, the oxygen deficiency level is described as including a positive value, 0, and a negative value, unless otherwise indicated.

The metal oxide having a low oxygen deficiency level is closer to the metal oxide of stoichiometric composition, and thus has a high resistance value, and the metal oxide having a high oxygen deficiency level is closer to a metal that is a component of the metal oxide, and thus has a low resistance value. Additionally, since the dissociative reaction to hydrogen atoms occurs in second electrode 105, it can be said that the reaction most likely occurs near interface 109 between second electrode 105 and metal oxide layer 104.

Figure 2A:
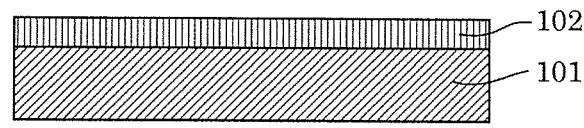
FIG. 2A is a cross-sectional view showing a manufacturing method of the gas sensor according to Embodiment 1.
Figure 2B:
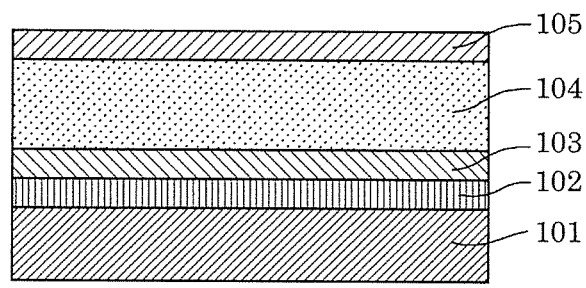
FIG. 2B is a cross-sectional view showing the manufacturing method of the gas sensor according to Embodiment 1.
Figure 2C:
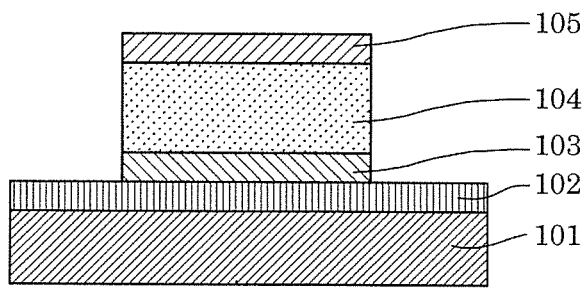
FIG. 2C is a cross-sectional view showing the manufacturing method of the gas sensor according to Embodiment 1.
Figure 2D:
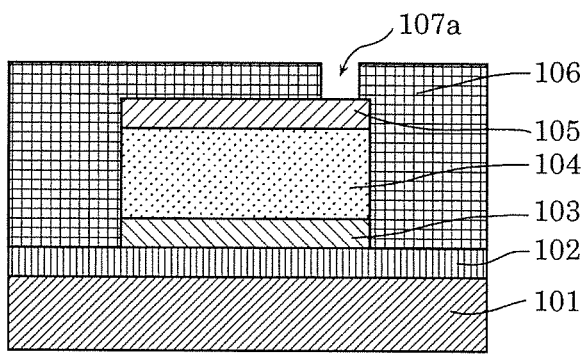
FIG. 2D is a cross-sectional view showing the manufacturing method of the gas sensor according to Embodiment 1.
Figure 2E:
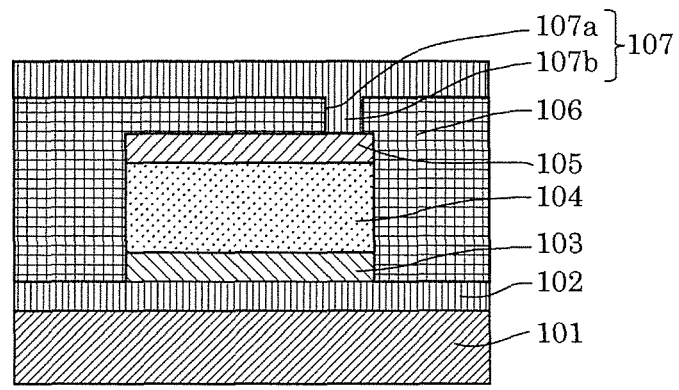
FIG. 2E is a cross-sectional view showing the manufacturing method of the gas sensor according to Embodiment 1.
Figure 2F:
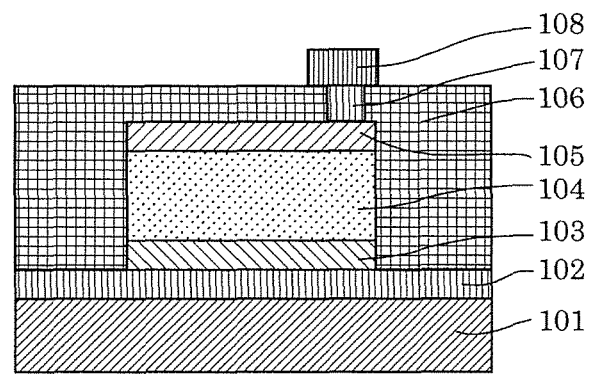
FIG. 2F is a cross-sectional view showing the manufacturing method of the gas sensor according to Embodiment 1.
Figure 2G:
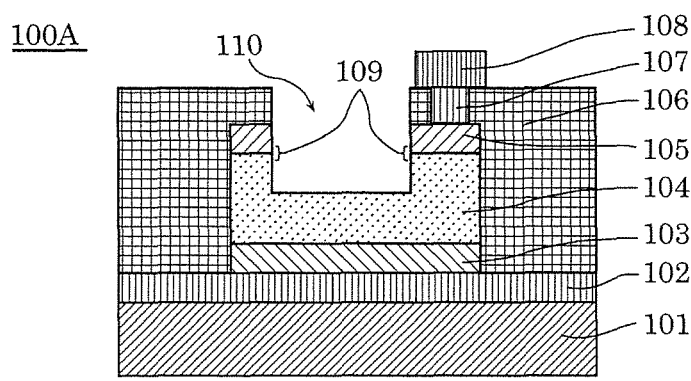
FIG. 2G is a cross-sectional view of the gas sensor according to Embodiment 1.
Figure 2H:
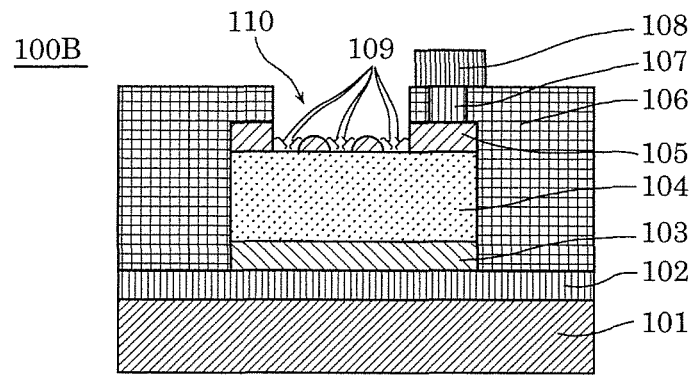
FIG. 2H is a cross-sectional view of a gas sensor according to Embodiment 1.
Figure 2I:
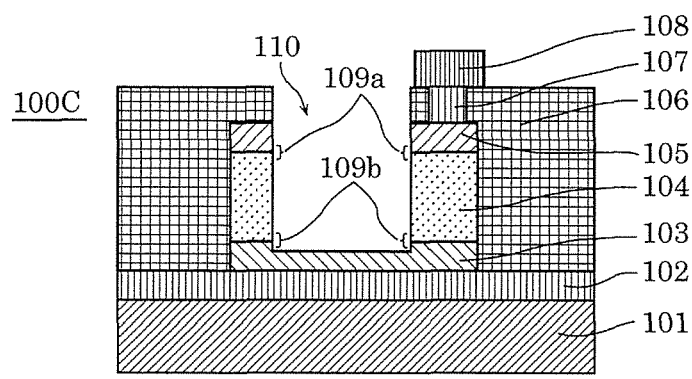
FIG. 2I is a cross-sectional view of a gas sensor according to Embodiment 1.
Figure 2J:
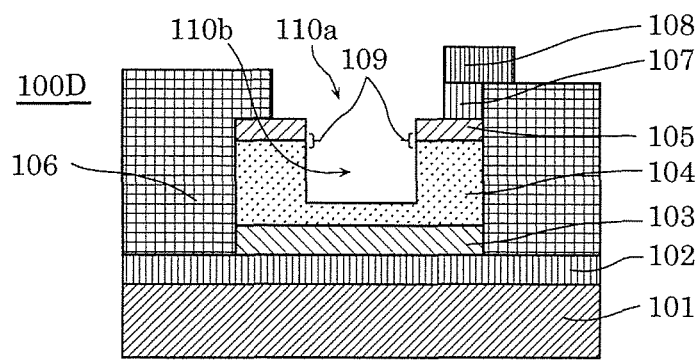
FIG. 2J is a cross-sectional view of a gas sensor according to Embodiment 1.
Figure 2K:
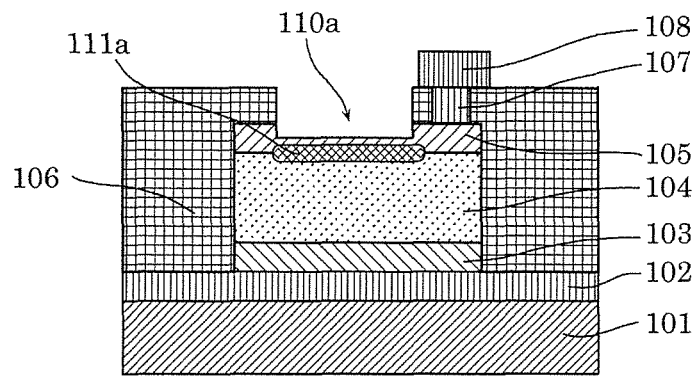
FIG. 2K is a cross-sectional view showing a manufacturing method of a gas sensor according to Embodiment 1.
Figure 2L:
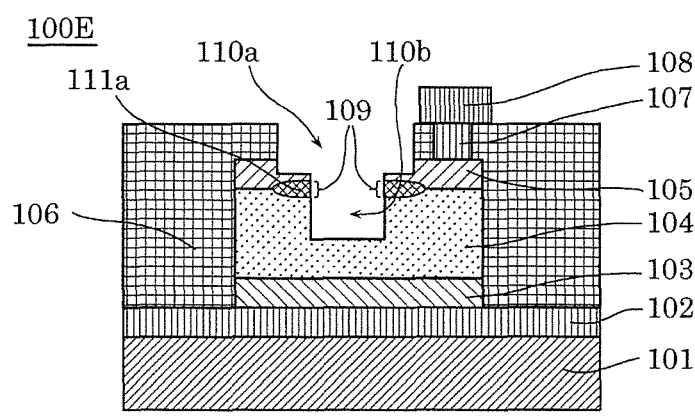
FIG. 2L is a cross-sectional view of the gas sensor according to Embodiment 1.

Here, as shown in FIGS. 2K and 2L described later, gas sensor 100A may include oxygen-deficient area 111a inside metal oxide layer 104, so as to contact second electrode 105. Oxygen-deficient area 111a is an oxygen-deficient area that is generated due to the etching damage received by metal oxide layer 104 at the time of etching for forming opening 110 or at the time of forming second electrode 105, for example. Second electrode 105 and metal oxide layer 104 may be mixed near the interface between second electrode 105 and metal oxide layer 104, and oxygen-deficient area 111a may be amorphized (see gas sensor 100E in FIG. 2L). Oxygen-deficient area 111a is formed in a part exposed to contact the hydrogen containing gas, or near interface 109 between second electrode 105 and metal oxide layer 104.

Figure 2M:
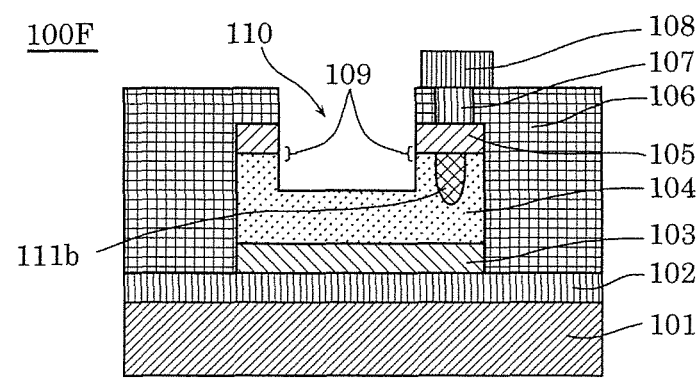
FIG. 2M is a cross-sectional view of a gas sensor according to Embodiment 1.

Additionally, as shown in FIG. 2M described later, gas sensor 100A may include local area 111b inside metal oxide layer 104. Local area 111b is formed by performing insulation breakdown of a part of metal oxide layer 104, by applying a voltage between first electrode 103 and second electrode 105. The part of metal oxide layer 104 subjected to the insulation breakdown locally suffers an oxygen loss, and is in the state where current easily flows. That is, local area 111b is an area including a minute conducting path (filament) configured by oxygen deficiency due to the insulation breakdown (see gas sensor 100F in FIG. 2M). The oxygen deficiency level in local area 111b is higher than the oxygen deficiency level around local area 111b (that is, a bulk area of metal oxide layer 104).

In gas sensor 100F provided with local area 111b, when a voltage is applied between first electrode 103 and second electrode 105, the current in metal oxide layer 104 intensively flows into local area 111b. According to this configuration, in gas sensor 100F, second electrode 105 is heated by generation of heat in local area 111b, and the dissociation to hydrogen atoms and the reduction reaction of the metal oxide in local area 111b are efficiently performed.

As for the filament forming local area 111b, only one filament may be formed in one metal oxide layer 104 of gas sensor 100F, or a plurality of filaments may exist in metal oxide layer 104. The number of filaments can be confirmed in EBAC (Electron Beam Absorbed Current) analysis, for example.

In this manner, gas sensor 100A (or gas sensors 100E and 100F) has the characteristic that the resistance value between first electrode 103 and second electrode 105 changes, when second electrode 105 contacts the hydrogen containing gas. With this characteristic, when a gas to be examined contacts gas sensor 100A, the hydrogen containing gas included in the gas can be detected by detecting a deterioration of the resistance value between first electrode 103 and second electrode 105.

Hereinafter, the details of the configuration of gas sensor 100A for obtaining a stable reaction characteristic to hydrogen are described.

Metal oxide layer 104 is formed of an oxide containing one metal selected from the group consisting of a metal capable of taking a plurality of oxidation states including a transition metal, tin, and aluminum. Among the transition metals, such as tantalum (Ta), hafnium (Hf), titanium (Ti), zirconium (Zr), niobium (Nb), tungsten (W), nickel (nickel), iron (Fe), chromium (Cr), cobalt (Co), manganese (Mn), vanadium (V), cerium (Ce) and copper (Cu), and tin (Sn) and aluminum (Al), at least one may be selected as the parent metal of the oxide of the metal.

Metal oxide layer 104 may be an oxygen-deficient oxide having a lower oxygen composition ratio than the oxide of stoichiometric composition. While the metal oxide of stoichiometric composition is typically an insulator, the oxygen-deficient metal oxide has oxygen deficiency and semiconductor-like characteristic. The oxygen deficiency in metal oxide layer 104 easily becomes an active site of an oxygen reduction reaction. That is, a reaction to hydrogen becomes easier. Accordingly, gas sensor 100A can realize a stable reaction characteristic to hydrogen.

The materials for first electrode 103 and second electrode 105 are selected from, for example, Pt (platinum), Ir (iridium), Pd (palladium), Ag (silver), Ni (nickel), W (tungsten), Cu (copper), Al (aluminum), Ta (tantalum), Ti (titanium), TiN (titanium nitride), TaN (tantalum nitride), TiAlN (titanium nitride aluminum), etc.

Specifically, second electrode 105 is formed of a material having a catalytic action that dissociates hydrogen atoms from gas molecules containing the hydrogen atoms, such as platinum (Pt), iridium (Ir) or palladium (Pd), or an alloy including at least one of these.

Additionally, first electrode 103 may be formed of a material having a lower normal electrode potential compared with the metal forming a metal oxide, such as tungsten (W), nickel (Ni), tantalum (Ta), titanium (Ti), aluminum (Al), tantalum nitride (TaN), and titanium nitride (TiN). The higher the value of the normal electrode potential is, the more the hardly oxidized characteristic is exhibited.

Alternatively, as in the case of second electrode 105, first electrode 103 may be formed of a material having a catalytic action that dissociates hydrogen atoms from gas molecules containing the hydrogen atoms, such as platinum (Pt), iridium (Ir) or palladium (Pd), or an alloy including at least one of these.

Additionally, for example, a silicon single crystal substrate or a semiconductor substrate can be used as substrate 101. However, substrate 101 is not necessarily limited to these. Since metal oxide layer 104 can be formed at a comparatively low substrate temperature, metal oxide layer 104 can also be formed on, for example, a resin material, etc.

[Manufacturing Method 1 of Gas Sensor]

Next, referring to FIGS. 2A to 2L, an example of the manufacturing method of gas sensors 100A to 100F of this embodiment is described.

First, as shown in FIG. 2A, insulating film 102 having a thickness of 200 nm is formed by a thermal oxidation method on substrate 101, which is single crystal silicon, for example.

Then, as shown in FIG. 2B, for example, a Pt film having a thickness of 50 nm is formed as first electrode 103 on insulating film 102 by a sputtering method. Further, an adhesion layer, such as Ti and TiN, can also be formed by a sputtering method between the Pt film serving as first electrode 103 and insulating film 102.

Thereafter, as shown in FIG. 2B, metal oxide layer 104 having a thickness of 30 nm is formed on first electrode 103 by, for example, a reactive sputtering method using a Ta target. Next, for example, a Pt film having a thickness of 10 nm is formed as second electrode 105 by a sputtering method on metal oxide layer 104. The thickness of the Pt film is preferably 5 nm or more to 200 nm or less.

Next, a mask (not shown) by photoresist is formed by a photo lithography process on second electrode 105.

Thereafter, as shown in FIG. 2C, first electrode 103, metal oxide layer 104, and second electrode 105 are formed into the shape of an element by dry etching using the mask. As shown in, for example, FIG. 1B, the shape of the element may be a shape that is a rectangular shape in the plan view.

Next, as shown in FIG. 2D, insulating film 106 is formed so as to cover insulating film 102, metal oxide layer 104, and second electrode 105. Then, via hole 107a reaching a part of the upper surface of second electrode 105 is provided in insulating film 106 by dry etching.

Next, as shown in FIG. 2E, conductor film 107b is formed such that the upper surface of insulating film 106 and the inside of via hole 107a are filled. Thereafter, as shown in FIG. 2F, conductor film 107b on insulating film 106 is removed by CMP (Chemical Mechanical Polishing), and via 107 is formed in via hole 107a. Further, wire conductor 108 connected to via 107 is formed by arranging and patterning a new conductor film on insulating film 106.

Next, as shown in FIG. 2G, opening 110 in which the side surfaces of second electrode 105 and a part of interface 109 between second electrode 105 and metal oxide layer 104 are exposed is provided in insulating film 106 by dry etching. For example, in gas sensor 100A, insulating film 106, second electrode 105, and a part of metal oxide layer 104 are sequentially removed to be recessed from the surface of insulating film 106, thereby forming opening 110. In this manner, insulating film 106, second electrode 105, a part of each side surface of metal oxide layer 104, and interface 109 between second electrode 105 and metal oxide layer 104 are exposed as the side surfaces of opening 110. Additionally, metal oxide layer 104 is exposed as the bottom surface of opening 110.

Note that opening 110 may be configured such that interface 109 between second electrode 105 and metal oxide layer 104 is exposed. For example, as in gas sensor 100B shown in FIG. 2H, opening 110 may be provided by dry etching such that a part of side surfaces of insulating film 106 and side surfaces of second electrode 105 are exposed as the side surfaces of opening 110, and a part of a surface of metal oxide layer 104 is exposed as the bottom surface of opening 110. In this gas sensor 100B, interface 109 between second electrode 105 and metal oxide layer 104 is exposed to the part in which second electrode 105 forming the side surfaces of opening 110 and metal oxide layer 104 forming the bottom surface of opening 110 contact to each other.

Further, as shown in FIG. 2H, a part of second electrode 105 that was not able to be removed by etching may remain in island shapes on metal oxide layer 104 exposed as the bottom surface of opening 110. In this case, as shown in FIG. 2H, interface 109 between second electrode 105 and metal oxide layer 104 is exposed to the part in which each second electrode 105 remaining in the island shapes and metal oxide layer 104 contact to each other.

Additionally, as in gas sensor 100C shown in FIG. 2I, opening 110 may be provided by dry etching such that side surfaces of insulating film 106, side surfaces of second electrode 105, side surfaces of metal oxide layer 104, and a part of side surfaces of first electrode 103 are exposed as the side surfaces of opening 110, and a part of first electrode 103 is exposed as the bottom surface of opening 110. In this gas sensor 100C, interface 109a between second electrode 105 and metal oxide layer 104, and interface 109b between metal oxide layer 104 and first electrode 103 are exposed to the side surfaces of opening 110. Interface 109a is a first interface, and interface 109b is a second interface.

In gas sensor 100C, first electrode 103 is formed of a material having a catalytic action that dissociates hydrogen atoms from gas molecule containing the hydrogen atoms, such as platinum (Pt), iridium (Ir) or palladium (Pd), or an alloy including at least one of these. In this manner, since the dissociative reaction to hydrogen atoms occurs not only in second electrode 105 but also in first electrode 103, it is possible to increase hydrogen atoms spread in metal oxide layer 104. That is, the improvement of sensitivity to hydrogen containing gas can be expected.

Additionally, as in gas sensor 100D shown in FIG. 2J, first opening 110a in which a part of a surface of second electrode 105 is exposed may be provided in insulating film 106 by dry etching, and thereafter second opening 110b may be provided by dry etching in which a part of side surfaces of second electrode 105 and side surfaces of metal oxide layer 104 are exposed. That is, in gas sensor 100D, first opening 110a is a larger opening than second opening 110b in the plan view. In this case, since the hydrogen containing gas permeates also from the upper part of second electrode 105 forming a part of the bottom surface of first opening 110a, the thinner the thickness of second electrode 105, the better. For example, the thickness of second electrode 105 is preferably 5 nm or more to 15 nm or less. By reducing the thickness of second electrode 105, it is possible to further shorten the time for hydrogen atoms dissociated in the upper surface of second electrode 105 to reach metal oxide layer 104.

Additionally, as in gas sensor 100E shown in FIGS. 2K and 2L, when first opening 110a in which a part of the surface of second electrode 105 is exposed is provided in insulating film 106, first opening 110a and second opening 110b may be processed under conditions causing an etching damage, and oxygen-deficient area 111a may be formed within metal oxide layer 104. Further, second electrode 105 and metal oxide layer 104 may be mixed and amorphized by the etching damage near the interface between second electrode 105 and metal oxide layer 104.

Alternatively, as in gas sensor 100F shown in FIG. 2M, in addition to the configuration of gas sensor 100A, local area 111b contacting second electrode 105 may be further formed within metal oxide layer 104. In FIG. 2M, local area 111b is formed by applying a voltage to gas sensor 100A shown in FIG. 2G. This is applicable to any of the configurations of gas sensors 100A to 100E.

In gas sensors 100A to 100F configured in these manners, in the side surfaces of opening 110, at least a part of interface 109 between second electrode 105 and metal oxide layer 104 is directly exposed to the hydrogen containing gas. As a result, the resistance change due to the hydrogen containing gas occurs in the previously-described mechanism, and hydrogen containing gas can be detected with a low power consumption.

Further, the larger the diameter of opening 110 is, the larger the area of interface 109 or the areas of interfaces 109a and 109b directly exposed to the hydrogen containing gas become, and more dissociated hydrogen atoms can be generated. At the same time, when the area of the part in which metal oxide layer 104 and second electrode 105 contact to each other becomes small, it becomes easy for the dissociated hydrogen atoms to spread in metal oxide layer 104. In this manner, the hydrogen containing gas can be detected at a higher speed. Additionally, the number of openings 110 is not restricted to one, and there may be a plurality of openings 110. Even if the opening area is the same, when a plurality of small openings are provided, it is possible to further increase the surface area of interface 109 or the surface areas of interfaces 109a and 109b directly exposed to the hydrogen containing gas.

[Hydrogen Containing Gas Reaction Characteristic]

Next, an exemplary evaluation of the resistance change characteristic due to the hydrogen containing gas of gas sensor 100F shown in FIG. 2M is described.

Figure 3A:
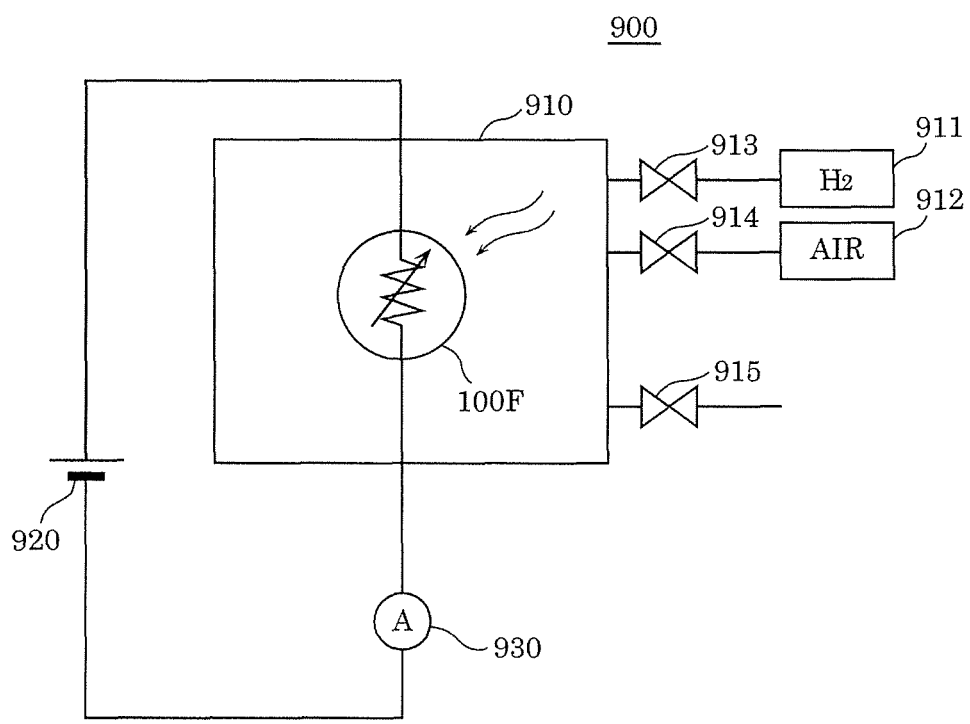
FIG. 3A is a diagram showing an evaluation system for the gas sensor according to Embodiment 1.

FIG. 3A is a block diagram showing an example of an evaluation system used for evaluation of gas sensor 100F. Evaluation system 900 shown in FIG. 3A includes airtight container 910 storing gas sensor 100F, power supply 920, and current measuring device 930. Airtight container 910 is configured to be connected to hydrogen cylinder 911 and air cylinder 912 via introduction valves 913 and 914, respectively, and is configured to be able to discharge an internal gas via exhaust valve 915.

Figure 3B:
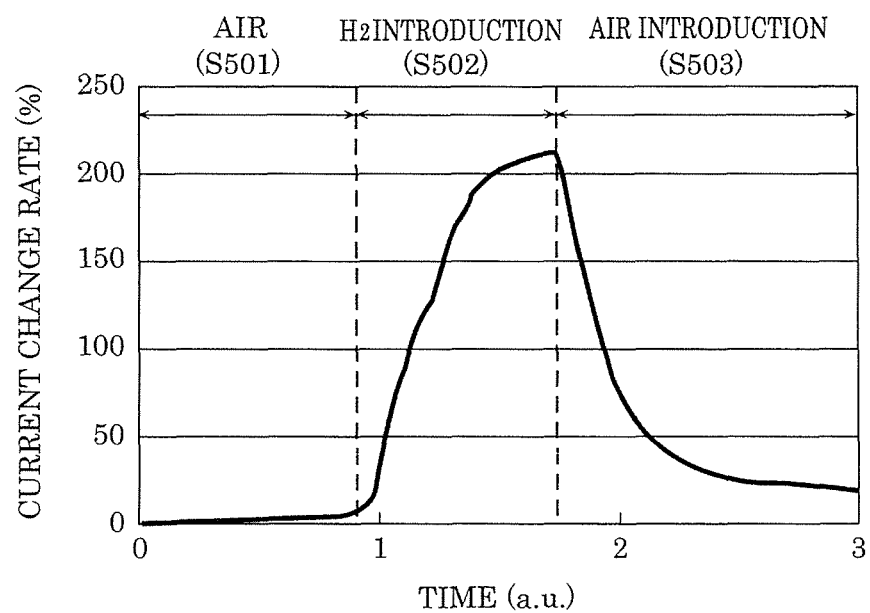
FIG. 3B is a diagram showing an evaluation result of the gas sensor according to Embodiment 1.

FIG. 3B is a graph showing the exemplary evaluation of gas sensor 100F. The horizontal axis represents the time (a.u.), and the vertical axis represents the current value (a.u.) that flows between first electrode 103 and second electrode 105. In the experiment, first, airtight container 910 in which gas sensor 100F is placed was sufficiently replaced with air, and hydrogen gas was introduced, and thereafter the hydrogen gas was switched to air.

FIG. 3B shows the result on this occasion, and three time periods in which previous air introduction (step S501), hydrogen introduction (step S502), and later air introduction (step S503) are performed are shown on the horizontal axis. It can be seen that the current value began to increase after the introductory gas was switched from air to hydrogen gas. Additionally, it can be seen that the current value began to decrease after the introductory gas was switched from the hydrogen gas to air.

In a monitoring operation of the hydrogen containing gas, the current of 150 µA to 300 µA flowed between first electrode 103 and second electrode 105 in the state where the detection voltage of 0.8 V was applied between first electrode 103 and second electrode 105, and the hydrogen gas was detected. Accordingly, according to gas sensor 100F, it is found that the hydrogen containing gas can be monitored with a low power consumption of 0.12 mW to 0.24 mW.

From this result, the inventors presume the detection mechanism of hydrogen gas in gas sensor 100F as follows.

When the hydrogen containing gas contacts second electrode 105, hydrogen atoms are dissociated from the hydrogen containing gas by the catalytic action of second electrode 105. The dissociated hydrogen atoms are spread inside from the surface of second electrode 105 or metal oxide layer 104, and a reduction reaction is performed within metal oxide layer 104. As a result, it is considered that the oxygen deficiency level of the metal oxide is increased, and the current that flows between first electrode 103 and second electrode 105 is increased.

Conversely, when there is no remaining hydrogen containing gas near second electrode 105, hydrogen atoms turn into hydrogen molecules near the surfaces of second electrode 105, so as to maintain an equilibrium state, and leave from the surfaces of second electrode 105 to the outside.

Accordingly, the reaction occurs in which water molecules generated in metal oxide layer 104 by the reduction reaction are decomposed into hydrogen atoms and oxygen atoms. The generated hydrogen atoms return into second electrode 105. Since the generated oxygen atoms are combined with oxygen deficiency, the oxygen deficiency level in metal oxide layer 104 is decreased. As a result, the current that flows between first electrode 103 and second electrode 105 is decreased.

Figure 3C:
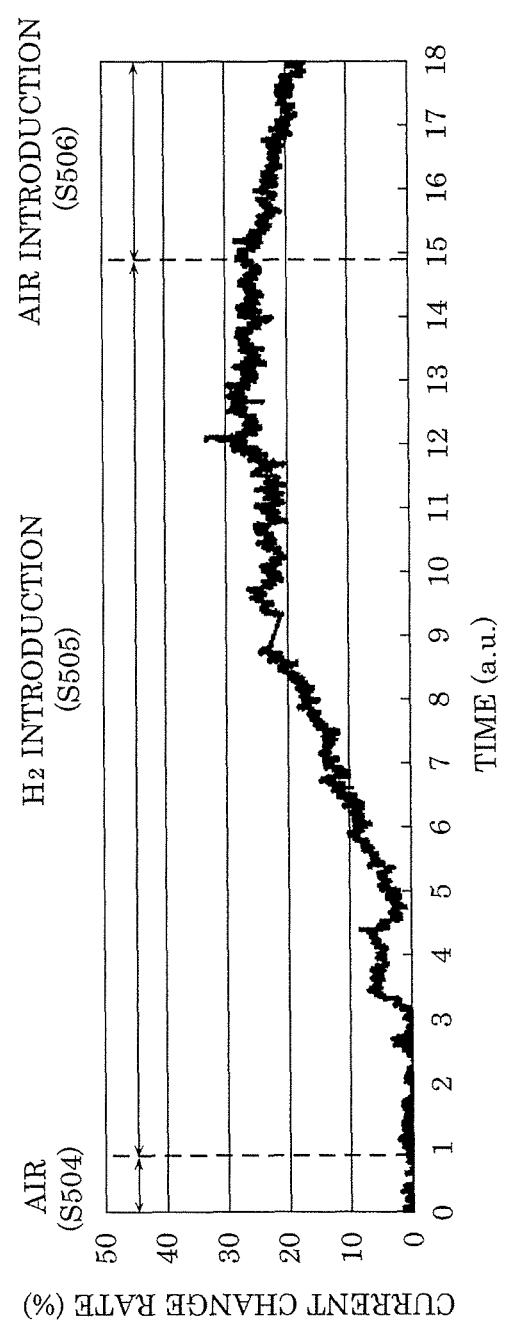
FIG. 3C is a diagram showing an evaluation result of a gas sensor according to a comparative example.

Meanwhile, FIG. 3C is a graph showing an exemplary evaluation of a gas sensor not provided with opening 110 as a comparative example. The horizontal axis represents the time (a.u.), and the vertical axis represents the current value (a.u.) that flows between first electrode 103 and second electrode 105.

As in the case of the result of gas sensor 100F showed in FIG. 3B, in FIG. 3C, three time periods in which previous air introduction (step S504), hydrogen introduction (step S505), and later air introduction (step S506) are performed are shown on the horizontal axis. In the gas sensor according to the comparative example, even if the introductory gas is switched from air to hydrogen gas, the current value does not rise immediately after the switching, but the current value is gently increased after a certain amount of time has passed. Additionally, the current change rate is about 30% increase at the maximum. Accordingly, it can be said that the current value is hardly increased even if hydrogen gas is introduced.

Additionally, the decrease in the current value gently occurs also when the introductory gas is switched from hydrogen gas to air. Accordingly, in the gas sensor according to the comparative example, compared with gas sensor 100F according to this embodiment, the detection speed is low, and the sensitivity is not improved. That is, in the configuration of the gas sensor according to this embodiment, compared with a gas sensor not provided with opening 110 as in the comparative example, the power consumption is low, and it is possible to detect gas molecules containing hydrogen atoms at a high speed and stably.

Further, the above-described operation is not limited to gas sensor 100F, and may also occur in gas sensors 100A to 100E with the structure of an important part substantially equal to that of gas sensor 100F, or in a gas sensor with a structure obtained by combining respective features. Additionally, the above-described operation is not limited to the case where the gas contacting second electrode 105 is hydrogen gas, and is considered to occur in the case where, for example, the gas is the hydrogen containing gas, such as methane and alcohol.

As described above, with gas sensors 100A to 100F according to this embodiment, the gas sensor is obtained that can detect the hydrogen containing gas without being heated by a separate heater, and that is excellent in the power-saving property.

Embodiment 2

[Configuration 2 of Gas Sensor]

As in the case of the gas sensor of Embodiment 1 described above, a gas sensor according to Embodiment 2 is a gas sensor based on the structure in which electrode layers are laminated on and under a metal oxide layer. The gas sensor is formed such that at least a part of an upper electrode layer is penetrated, so that the interface between the metal oxide layer and the upper electrode layer is exposed, and the hydrogen containing gas can be detected without being heated by a heater. Here, the hydrogen containing gas is a general term for a gas consisting of molecules containing hydrogen atoms, and may contain hydrogen, methane, alcohol, etc. as an example.

Figure 4A:
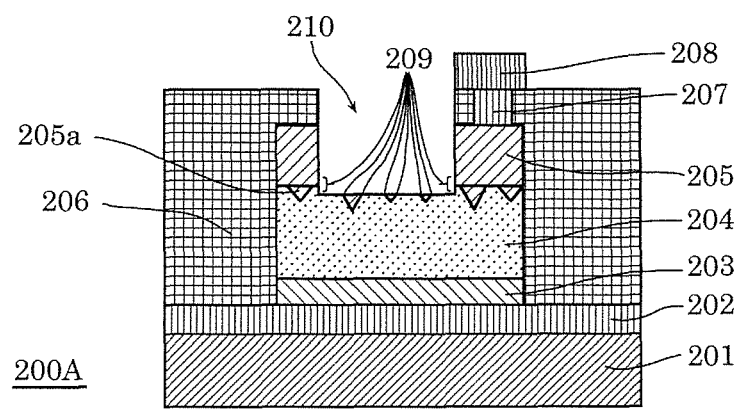
FIG. 4A is a cross-sectional view of a gas sensor according to Embodiment 2.
Figure 4B:
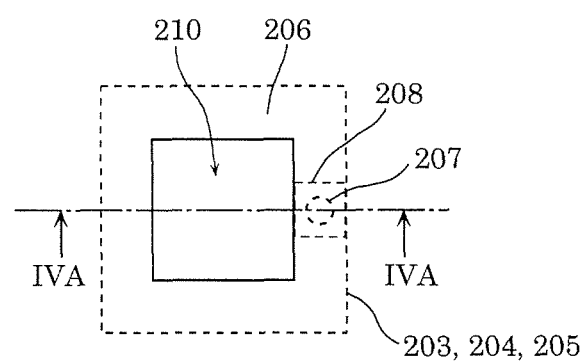
FIG. 4B is a plan view of the gas sensor according to Embodiment 2.

FIG. 4A is a cross-sectional view showing one exemplary configuration of gas sensor 200A according to Embodiment 2. FIG. 4B is a plan view showing one exemplary configuration of gas sensor 200A according to Embodiment 2. The cross section of FIG. 4A corresponds to the cross section seen in the direction indicated by arrows in the IVA-IVA cutout line in FIG. 4B.

As shown in FIG. 4A and FIG. 4B, gas sensor 200A includes substrate 201, insulating film 202 formed on substrate 201, first electrode 203 formed above insulating film 202, second electrode 205, metal oxide layer 204 sandwiched between first electrode 203 and second electrode 205, insulating film 206, via 207, and wire conductor 208.

Additionally, the difference between gas sensor 200A and gas sensor 100A of Embodiment 1 described above is that protrusions 205a are formed toward the inside of metal oxide layer 204 from second electrode 205. For example, when second electrode 205 is formed of a metal (for example, Pt) having a catalytic action, crystalline disorder tends to occur in metal oxide layer 204 due to the formation of protrusions 205a, and oxygen deficiency easily occurs. Alternatively, when a voltage is applied between first electrodes 203 and second electrode 205, since an electric field is concentrated near protrusions 205a, as shown in FIG. 5I described later, local area 211 is easily formed near protrusions 205a.

The larger the thickness of a Pt film is, the easier the formation of protrusions 205a becomes in relation to stress, and protrusions 205a can also be controlled by the temperature and time of the heat treatment.

[Manufacturing Method 2 of Gas Sensor]

Next, referring to FIGS. 5A to 5I, an example of the manufacturing method of gas sensors 200A and 200B of this embodiment is described.

Figure 5A:
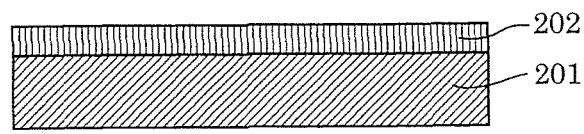
FIG. 5A is a cross-sectional view showing a manufacturing method of the gas sensor according to Embodiment 2.

First, as shown in FIG. 5A, insulating film 202 having a thickness of 200 nm is formed by a thermal oxidation method on substrate 201, which is single crystal silicon, for example.

Figure 5B:
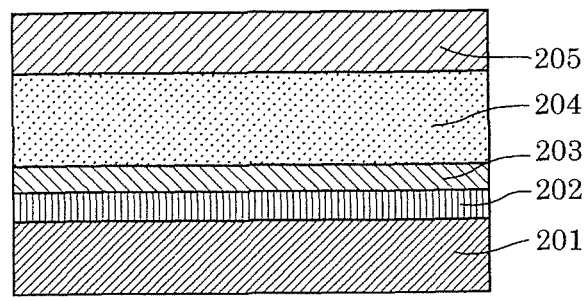
FIG. 5B is a cross-sectional view showing the manufacturing method of the gas sensor according to Embodiment 2.

Then, as shown in FIG. 5B, a Pt film having a thickness of, for example, 50 nm is formed as first electrode 203 on insulating film 202 by a sputtering method. Note that an adhesion layer, such as Ti and TiN, can also be formed by a sputtering method between the Pt film serving as first electrode 203 and insulating film 202.

Thereafter, as shown in FIG. 5B, metal oxide layer 204 having a thickness of 30 nm is formed on first electrode 203 by, for example, a reactive sputtering method using a Ta target.

Next, for example, a Pt film having a thickness of 20 nm is formed as second electrode 205 on metal oxide layer 204 by a sputtering method.

Figure 5C:
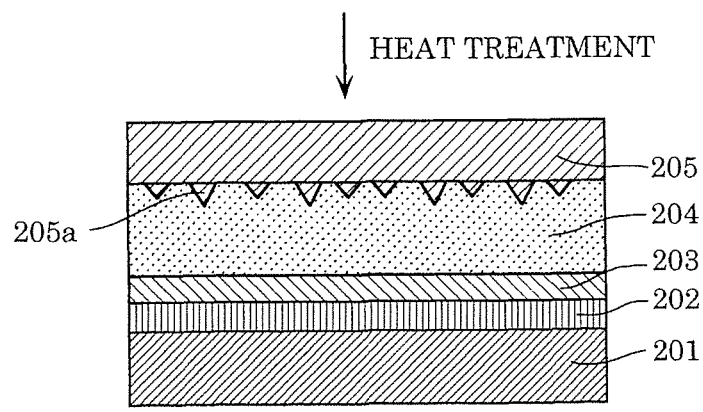
FIG. 5C is a cross-sectional view showing the manufacturing method of the gas sensor according to Embodiment 2.

Next, as shown in FIG. 5C, protrusions 205a are formed in second electrode 205 toward the inside of metal oxide layer 204 from second electrode 205 by performing, for example, heat treatment in a nitrogen atmosphere at 400° C. for 10 minutes. The thickness of the Pt film is preferably 5 nm or more to 200 nm or less. The temperature of the heat treatment is preferably 350° C. or more to 425° C. or less, and the time for the heat treatment is preferably 10 minutes or more to 30 minutes or less. The larger the thickness of the Pt film is, the easier the formation of protrusions 205a becomes in relation to stress, and protrusions 205a can also be controlled by the temperature and time of the heat treatment. Crystalline disorder occurs in metal oxide layer 204 near protrusions 205a due to the formation of protrusions 205a, and an area is generated where oxygen is locally deficient.

Additionally, in metal oxide layer 204 near protrusions 205a, the thickness of metal oxide layer 204 is reduced for the height of protrusions 205a. Accordingly, when a voltage is applied between first electrode 203 and second electrode 205, an electric field concentrates near protrusions 205a. That is, in metal oxide layer 204 near protrusions 205a, there is an electric field concentration region in which an electric field is easily concentrated. In the electric field concentration region, as in the case of the local area, it is easy for current to flow, and oxygen is deficient. Thus, it is also easy for a reduction reaction with hydrogen atoms to occur.

Next, a mask (not shown) by photoresist is formed by a photo lithography process on second electrode 205.

Figure 5D:
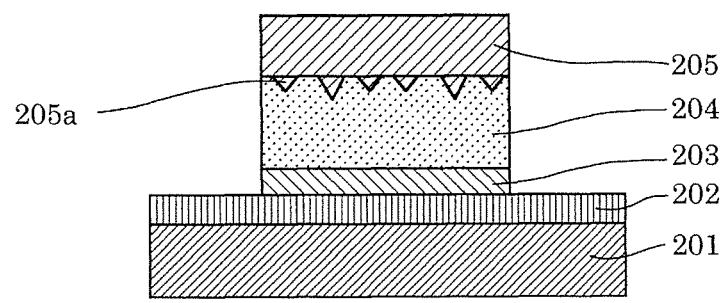
FIG. 5D is a cross-sectional view showing the manufacturing method of the gas sensor according to Embodiment 2.

Thereafter, as shown in FIG. 5D, first electrode 203, metal oxide layer 204, and second electrode 205 are formed into the shape of an element by dry etching using the mask. The shape of the element may be, for example, a shape that is a rectangular shape in the plan view.

Figure 5E:
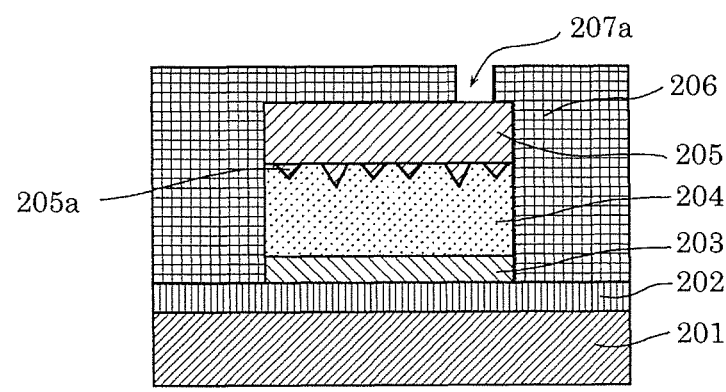
FIG. 5E is a cross-sectional view showing the manufacturing method of the gas sensor according to Embodiment 2.

Next, as shown in FIG. 5E, insulating film 206 is formed so as to cover insulating film 202, metal oxide layer 204, and second electrode 205. Then, via hole 207a reaching a part of the upper surface of second electrode 205 is provided in insulating film 206 by etching.

Figure 5F:
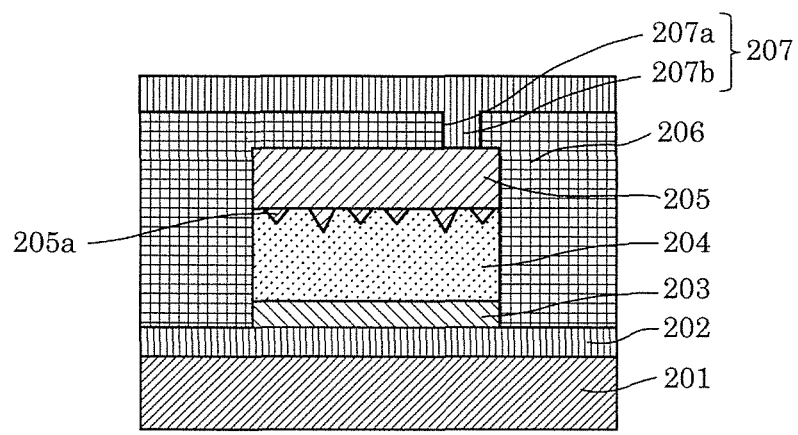
FIG. 5F is a cross-sectional view showing the manufacturing method of the gas sensor according to Embodiment 2.
Figure 5G:
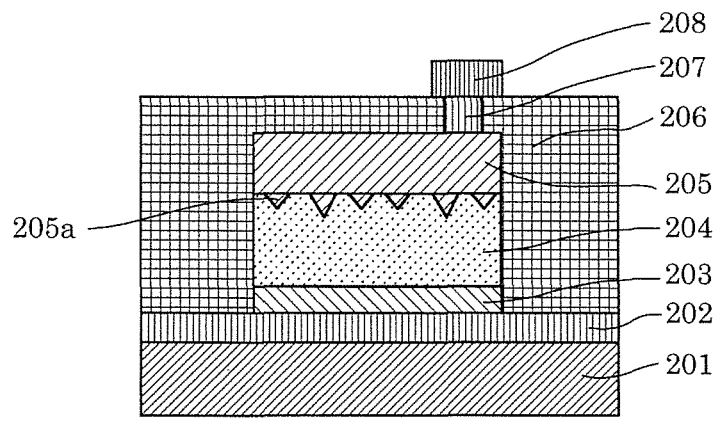
FIG. 5G is a cross-sectional view showing the manufacturing method of the gas sensor according to Embodiment 2.

Next, as shown in FIG. 5F, conductor film 207b is formed so that the upper surface of insulating film 206 and the inside of via hole 207a are filled. Thereafter, as shown in FIG. 5G, via 207 is formed in via hole 207a by removing conductor film 207b on insulating film 206 by CMP. Further, wire conductor 208 connected to via 207 is formed by arranging and patterning a new conductor film on insulating film 206.

Figure 5H:
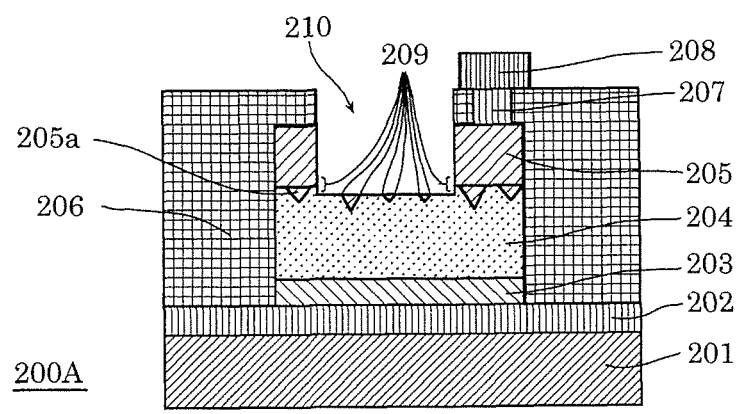
FIG. 5H is a cross-sectional view of a gas sensor according to Embodiment 2.
Figure 5I:
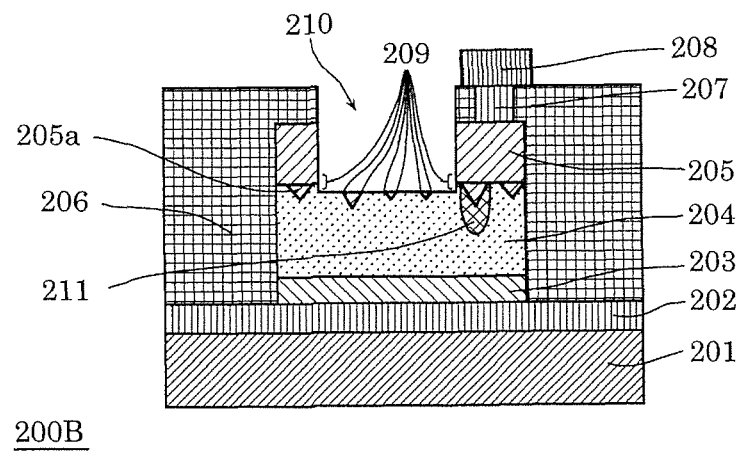
FIG. 5I is a cross-sectional view of a gas sensor according to Embodiment 2.

Next, as in gas sensor 200A shown in FIG. 5H, opening 210 in which a part of interface 209 between second electrode 205 and metal oxide layer 204 is exposed is provided in insulating film 206 by dry etching. For example, in gas sensor 200A, insulating film 206, second electrode 205, and a part of metal oxide layer 204 are sequentially removed to be recessed from the surface of insulating film 206, thereby forming opening 210.

It this manner, a part of respective side surfaces of insulating film 206, second electrode 205, and metal oxide layer 204, and interfaces 209 between second electrode 205 and metal oxide layer 204 are exposed as the side surfaces of opening 210. Additionally, metal oxide layer 204 and protrusions 205a that were formed in second electrode 205 are exposed as the bottom surface of opening 210. Accordingly, interfaces 209 between metal oxide layer 204 and protrusions 205a are also exposed to the bottom surface of opening 210. Note that interface 209 is the first interface.

Further, as in gas sensor 200B shown in FIG. 5I, in addition to the configuration of gas sensor 200A, local area 211 may be formed in metal oxide layer 204 so as to contact second electrode 205 by further applying a voltage between first electrode 203 and second electrode 205.

Additionally, as in gas sensor 100B showed in Embodiment 1, in opening 210 of gas sensor 200A, a part of second electrode 205 that was not able to be removed by etching may remain in island shapes on metal oxide layer 204 exposed as the bottom surface of opening 210.

Additionally, opening 210 of gas sensor 200A is not limited to the configuration in which a part of interface 209 between second electrode 205 and metal oxide layer 204 is exposed to insulating film 206. As in gas sensor 100C shown in Embodiment 1, a configuration may be adopted in which a part of interface between first electrode 203 and metal oxide layer 204 is exposed, in addition to a part of interface 209 between second electrode 205 and metal oxide layer 204.

Additionally, as in gas sensor 100D shown in Embodiment 1, opening 210 of gas sensor 200A may be configured by the first opening and the second opening having different sizes in the plan view.

Additionally, in the bottom surface of opening 210 of gas sensor 200A, as in gas sensor 100E shown in Embodiment 1, when providing first opening 210a in which a part of a surface of second electrode 205 is exposed to insulating film 206, an oxygen-deficient area may be formed in metal oxide layer 204 by processing the first opening and the second opening under conditions causing an etching damage. Further, second electrode 205 and metal oxide layer 204 may be mixed and amorphized by the etching damage near the interface between second electrode 205 and metal oxide layer 204.

Further, in this embodiment, the heat treatment for forming protrusions 205a of second electrode 205 is performed after forming second electrode 205. However, the heat treatment may be performed in any process, as long as the heat treatment is after the film formation of the Pt film forming second electrode 205. Additionally, when there is a process of performing heat treatment of 350° C. or more to 425° C. or less in the processes after forming second electrode 205, this process may also serve as the above-described heat treatment.

In gas sensors 200A and 200B configured in this manner, in the side surfaces of opening 210, at least a part of interface 209 between second electrode 205 and metal oxide layer 204 is directly exposed to the hydrogen containing gas. As a result, the resistance change due to the hydrogen containing gas occurs in the previously-described mechanism, and the hydrogen containing gas can be detected with a low power consumption.

Variations of Embodiments 1 and 2

The following variations may be added to the configurations of gas sensors according to Embodiments 1 and 2. FIG. 6A to FIG. 6I are cross-sectional views of gas sensors according to the variations of Embodiments 1 and 2.

As in the case of the gas sensors shown in Embodiments 1 and 2, the gas sensors shown in FIGS. 6A to 6I includes substrate 301, insulating film 302 formed on substrate 301, first electrode 303 formed above insulating film 302, second electrode 305, metal oxide layer 304 sandwiched between first electrode 303 and second electrode 305, insulating film 306, via 307, and wire conductor 308.

Additionally, metal oxide layer 304 is formed by two layers, i.e., first metal oxide layer 304a and second metal oxide layer 304b. Second metal oxide layer 304b is a metal oxide layer having a higher oxygen concentration than first metal oxide layer 304a. Additionally, second metal oxide layer 304b is formed to be thinner than first metal oxide layer 304a. Note that metal oxide layer 304 is not limited to the two-layer configuration as described above, and may be formed by one layer as in the gas sensors shown in Embodiments 1 and 2.

Additionally, as in the case of gas sensor 100F shown in Embodiment 1, the gas sensors shown in FIGS. 6A to 6I includes local area 311. Note that the gas sensor may have a configuration without local area 311. Additionally, the gas sensor may have a configuration with oxygen-deficient area 111a.

The gas sensors shown in FIGS. 6A to 6I have respective different configurations of opening 310. Hereinafter, the configuration of opening 310 of the gas sensor shown in each diagram is described.

[Variation 1]

Figure 6A:
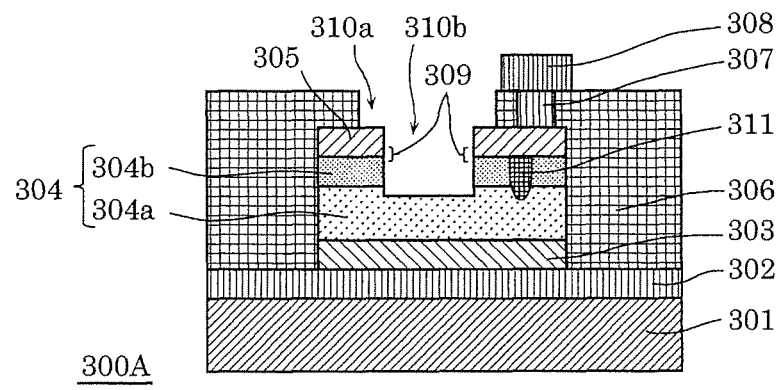
FIG. 6A is a cross-sectional view of a gas sensor according to a variation of Embodiments 1 and 2.

As in the case of gas sensor 100D according to Embodiment 1, gas sensor 300A shown in FIG. 6A includes first opening 310a and second opening 310b as opening 310. In gas sensor 300A, first opening 310a is an opening larger than second opening 310b in the plan view.

In this case, the hydrogen containing gas also permeates from the upper part of second electrode 305 that forms a part of the bottom surface of first opening 310a. Thus, the thinner the thickness of second electrode 305, the better. For example, the thickness of second electrode 305 may be 5 nm or more to 15 nm or less. By reducing the thickness of second electrode 305, it is possible to further shorten the time for hydrogen atoms dissociated in the upper surface of second electrode 305 to reach inside metal oxide layer 304.

Additionally, in gas sensor 300A, a part of respective side surfaces of second electrode 305, first metal oxide layer 304a and second metal oxide layer 304b, and interface 309 between second electrode 305 and second metal oxide layer 304b are exposed to the side surfaces of second opening 310b. Interface 309 is the first interface. Additionally, first metal oxide layer 304a is exposed as the bottom surface of second opening 310b.

In this manner, in gas sensor 300A, in the side surfaces of second opening 310b, at least a part of interface 309 between second electrode 305 and second metal oxide layer 304b is directly exposed to the hydrogen containing gas. As a result, the resistance change due to the hydrogen containing gas occurs in the previously-described mechanism, and the hydrogen containing gas can be detected with a low power consumption.

[Variation 2]

Figure 6B:
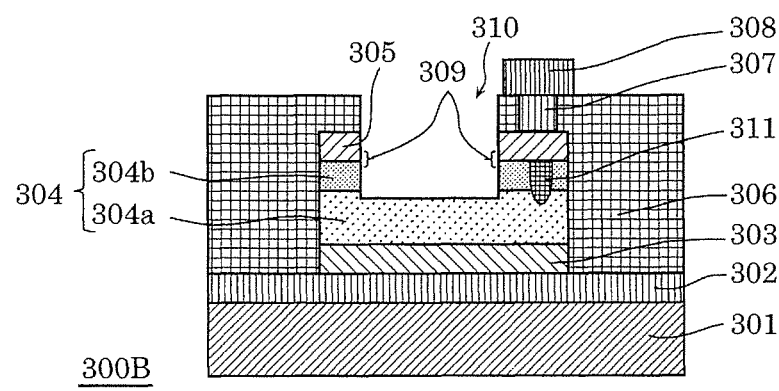
FIG. 6B is a cross-sectional view of a gas sensor according to a variation of Embodiments 1 and 2.

As in the case of gas sensor 100A according to Embodiment 1, gas sensor 300B shown in FIG. 6B includes opening 310 smaller than the size of gas sensor 300B at the position including the middle of gas sensor 300B in the plan view. A part of respective side surfaces of insulating film 306, second electrode 305, first metal oxide layer 304a and second metal oxide layer 304b, and interface 309 between second electrode 305 and second metal oxide layer 304b are exposed as the side surfaces of opening 310. Interface 309 is the first interface. Additionally, first metal oxide layer 304a is exposed as the bottom surface of opening 310.

In this manner, in gas sensor 300B, at least a part of interface 309 between second electrode 305 and second metal oxide layer 304b is directly exposed to the hydrogen containing gas in the side surfaces of opening 310. As a result, the resistance change due to the hydrogen containing gas occurs in the previously-described mechanism, and the hydrogen containing gas can be detected with a low power consumption.

[Variation 3]

Figure 6C:
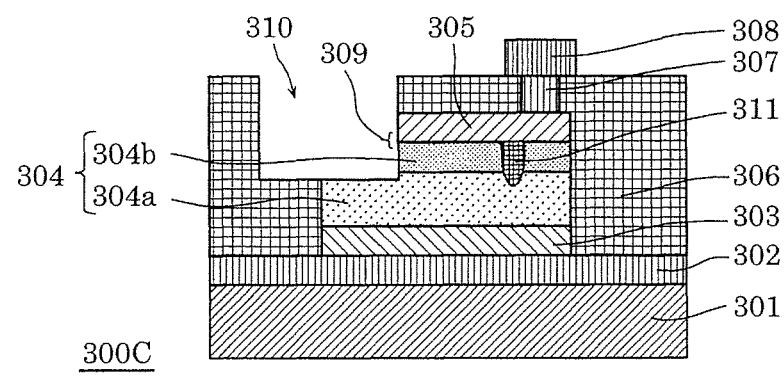
FIG. 6C is a cross-sectional view of a gas sensor according to a variation of Embodiments 1 and 2.

Gas sensor 300C shown in FIG. 6C includes opening 310 at the position not including the middle of gas sensor 300C in the plan view, and in an area including a part of an end of the element of gas sensor 300C. That is, opening 310 includes side surfaces formed by insulating film 306 to the bottom surface, and side surfaces formed by insulating film 306, second electrode 305, first metal oxide layer 304a and second metal oxide layer 304b. Additionally, a part of interface 309 between second electrode 305 and second metal oxide layer 304b is exposed to a side surface of opening 310. Interface 309 is the first interface. Additionally, insulating film 306 and second metal oxide layer 304b are exposed in the bottom surface of opening 310.

In this manner, in gas sensor 300C, at least a part of interface 309 between second electrode 305 and second metal oxide layer 304b is directly exposed to the hydrogen containing gas in the side surfaces of opening 310. As a result, the resistance change due to the hydrogen containing gas occurs in the previously-described mechanism, and the hydrogen containing gas can be detected with a low power consumption.

[Variation 4]

Figure 6D:
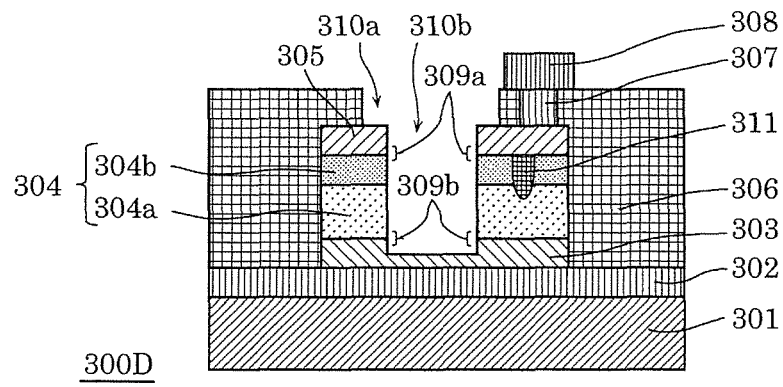
FIG. 6D is a cross-sectional view of a gas sensor according to a variation of Embodiments 1 and 2.

As in the case of gas sensor 300A shown in FIG. 6A, gas sensor 300D shown in FIG. 6D includes first opening 310a and second opening 310b as opening 310. Since the configuration of first opening 310a is the same as the configuration of gas sensor 300A, its description is omitted. In second opening 310b, the side surfaces of second electrode 305, side surfaces of first metal oxide layer 304a, side surfaces of second metal oxide layer 304b, and a part of side surfaces of first electrode 303 are exposed as the side surfaces of second opening 310b, and a part of first electrode 303 is exposed as the bottom surface of second opening 310b. Additionally, in gas sensor 300D, interface 309a between second electrode 305 and second metal oxide layer 304b, and interface 309b between first metal oxide layer 304a and first electrode 303 are exposed in the side surfaces of second opening 310b. Note that interface 309a is the first interface, and interface 309b is the second interface.

In gas sensor 300D, first electrode 303 is formed of a material having a catalytic action that dissociates hydrogen atoms from gas molecule containing the hydrogen atoms, such as platinum (Pt), iridium (Ir) or palladium (Pd), or an alloy including at least one of these. In this manner, since the dissociative reaction to hydrogen atoms occurs not only in second electrode 305 but also in first electrode 303, it is possible to increase hydrogen atoms spread in first metal oxide layer 304a and second metal oxide layer 304b. That is, the improvement of sensitivity to the hydrogen containing gas can be expected.

[Variation 5]

Figure 6E:
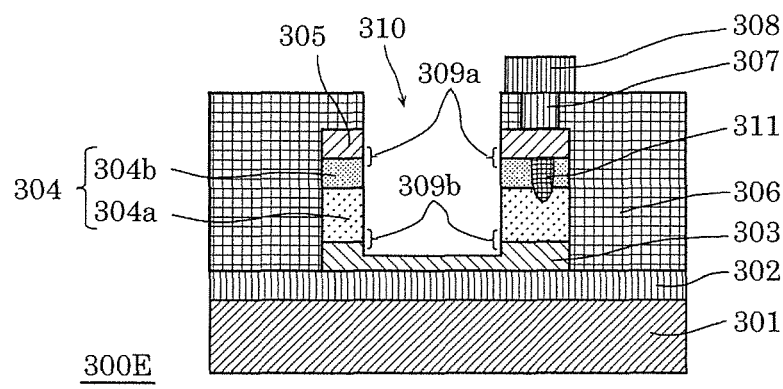
FIG. 6E is a cross-sectional view of a gas sensor according to a variation of Embodiments 1 and 2.

As in the case of gas sensor 300B shown in FIG. 6B, gas sensor 300E shown in FIG. 6E includes opening 310 smaller than the size of gas sensor 300E at the position including the middle of gas sensor 300E in the plan view. A part of respective side surfaces of insulating film 306, second electrode 305, first metal oxide layer 304a, second metal oxide layer 304b and first electrode 303, a part of interface 309a between second electrode 305 and second metal oxide layer 304b, and a part of interface 309b between first electrode 303 and first metal oxide layer 304a are exposed as the side surfaces of opening 310. First electrode 303 is exposed as the bottom surface of opening 310. Note that interface 309a is the first interface, and interface 309b is the second interface.

In this manner, in gas sensor 300E, at least a part of interface 309a between second electrode 305 and second metal oxide layer 304b, and a part of interface 309b between first electrode 303 and first metal oxide layer 304a are directly exposed to the hydrogen containing gas in the side surfaces of opening 310. As a result, the resistance change due to the hydrogen containing gas occurs in the previously-described mechanism, and the hydrogen containing gas can be detected with a low power consumption.

[Variation 6]

Figure 6F:
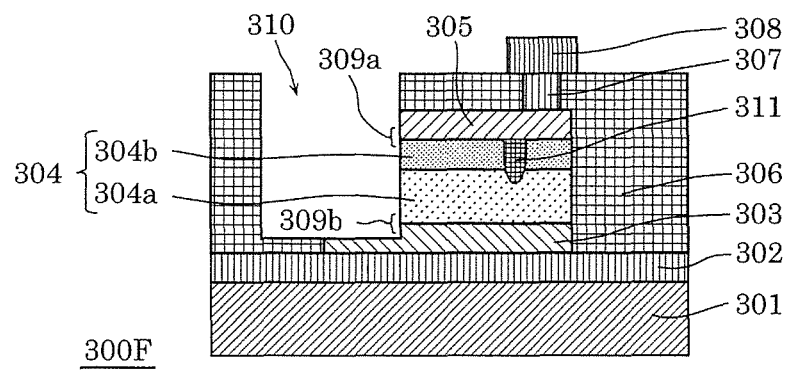
FIG. 6F is a cross-sectional view of a gas sensor according to a variation of Embodiments 1 and 2.

As in the case of gas sensor 300C shown in FIG. 6C, gas sensor shown in FIG. 6F includes opening 310 at the position not including the middle of gas sensor 300F in the plan view, and in an area including a part of an end of the element of gas sensor 300F. That is, opening 310 includes side surfaces formed by insulating film 306 to the bottom surface, and side surfaces formed by insulating film 306, second electrode 305, first metal oxide layer 304a, second metal oxide layer 304b, and first electrode 303. Additionally, a part of interface 309a between second electrode 305 and second metal oxide layer 304b, and a part of interface 309b between first electrode 303 and first metal oxide layer 304a are exposed to in the side surfaces of opening 310. Interface 309a is the first interface, and interface 309b is the second interface. Additionally, insulating film 306 and second metal oxide layer 304b are exposed in the bottom surface of opening 310.

In this manner, in gas sensor 300F, at least a part of interface 309a between second electrode 305 and second metal oxide layer 304b, and a part of interface 309b between first electrode 303 and first metal oxide layer 304a are directly exposed to the hydrogen containing gas in the side surfaces of opening 310. As a result, the resistance change due to the hydrogen containing gas occurs in the previously-described mechanism, and the hydrogen containing gas can be detected with a low power consumption.

[Variation 7]

Figure 6G:
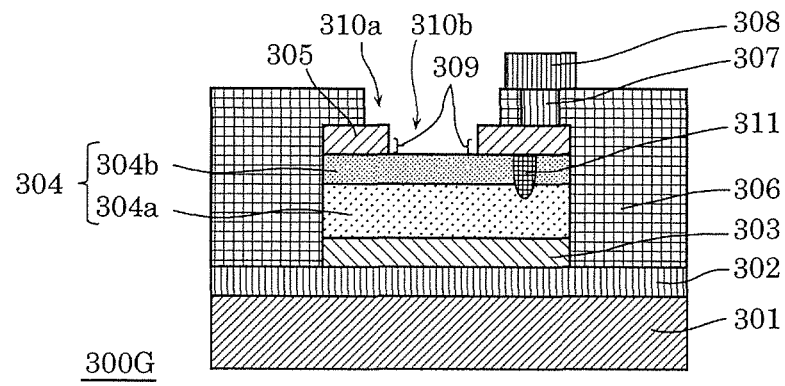
FIG. 6G is a cross-sectional view of a gas sensor according to a variation of Embodiments 1 and 2.

As in the case of gas sensor 300A shown in FIG. 6A, gas sensor 300G shown in FIG. 6G includes first opening 310a and second opening 310b as opening 310. Since the configuration of first opening 310a is the same as the configuration of gas sensor 300A, its description is omitted. In second opening 310b, a part of side surfaces of second electrode 305 is exposed as the side surfaces of second opening 310b, and a part of second electrode 305 is exposed as the bottom surface of second opening 310b. Additionally, interface 309 between second electrode 305 and second metal oxide layer 304b is exposed in the boundary between the side surfaces of second opening 310b and the bottom surface. Interface 309 is the first interface.

In this manner, in gas sensor 300G, at least a part of interface 309 between second electrode 305 and second metal oxide layer 304b is directly exposed to the hydrogen containing gas. As a result, it is possible to increase hydrogen atoms spread in second metal oxide layer 304b and first metal oxide layer 304a. That is, the improvement of sensitivity to the hydrogen containing gas can be expected.

[Variation 8]

Figure 6H:
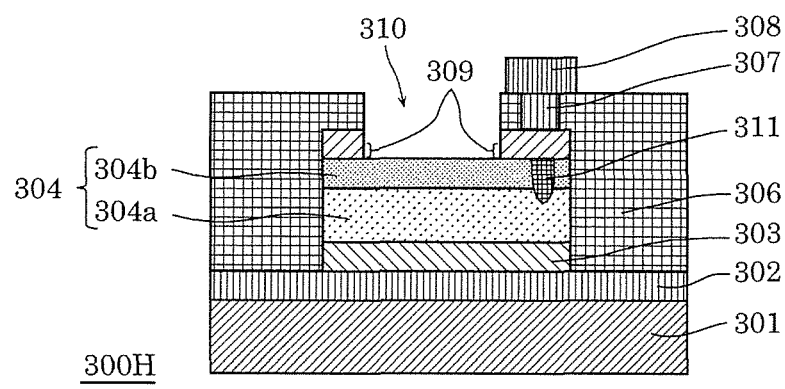
FIG. 6H is a cross-sectional view of a gas sensor according to a variation of Embodiments 1 and 2.

As in the case of gas sensor 300B shown in FIG. 6B, gas sensor 300H shown in FIG. 6H includes opening 310 smaller than the size of gas sensor 300H at the position including the middle of gas sensor 300H in the plan view. A part of respective side surfaces of insulating film 306 and second electrode 305 are exposed as the side surfaces of opening 310. Second metal oxide layer 304b is exposed as the bottom surface of opening 310. Additionally, interface 309 between second electrode 305 and second metal oxide layer 304b is exposed in the boundary between the side surfaces of opening 310 and a bottom surface. Interface 309 is the first interface.

In this manner, in gas sensor 300H, at least a part of interface 309 between second electrode 305 and second metal oxide layer 304b is directly exposed to the hydrogen containing gas in the side surfaces of opening 310. As a result, the resistance change due to the hydrogen containing gas occurs in the previously-described mechanism, and the hydrogen containing gas can be detected with a low power consumption.

[Variation 9]

Figure 6I:
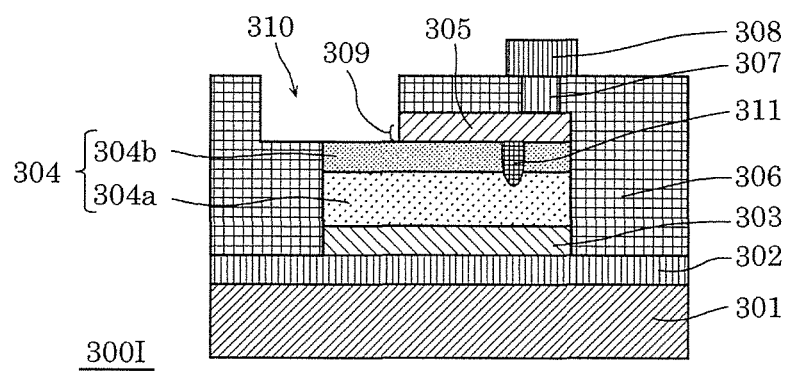
FIG. 6I is a cross-sectional view of a gas sensor according to a variation of Embodiments 1 and 2.

As in the case of gas sensor 300C shown in FIG. 6C, gas sensor 300I shown in FIG. 6I includes opening 310 at the position not including the middle of gas sensor 300I in the plan view, and in an area including a part of an end of the element of gas sensor 300I. Opening 310 includes the side surfaces formed by insulating film 306 to a bottom surface, and the side surfaces formed by insulating film 306 and second electrode 305. Additionally, a part of side surface of insulating film 306 and a part of side surface of second electrode 305 are exposed in the side surface of opening 310. Second metal oxide layer 304b is exposed in the bottom surface of opening 310. Additionally, interface 309 between second electrode 305 and second metal oxide layer 304b is exposed in the boundary between the side surface of opening 310 and the bottom surface. Interface 309 is the first interface.

In this manner, in gas sensor 300I, at least a part of interface 309 between second electrode 305 and second metal oxide layer 304b is directly exposed to the hydrogen containing gas in the side surface of opening 310. As a result, the resistance change due to the hydrogen containing gas occurs in the previously-described mechanism, and the hydrogen containing gas can be detected with a low power consumption.

Embodiment 3

A fuel cell powered vehicle according to Embodiment 3 includes one of the gas sensors described in Embodiments 1 and 2 and their variations described above, and detects the hydrogen gas in the vehicle by the gas sensor.

Figure 7:
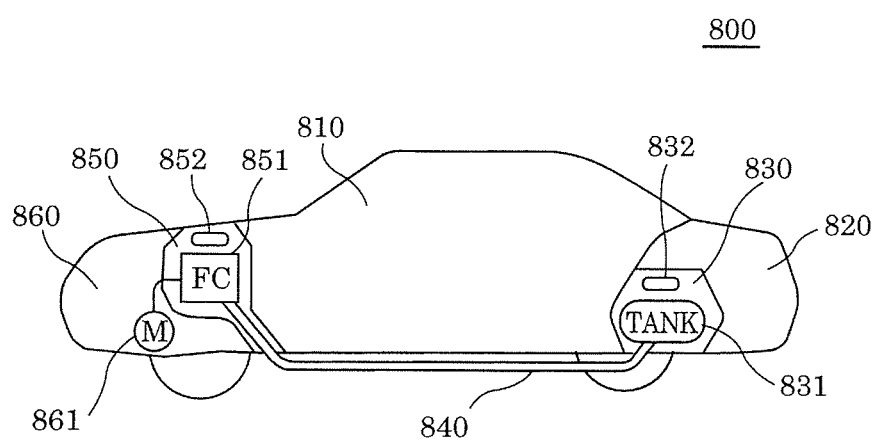
FIG. 7 is a side view of a fuel cell powered vehicle according to Embodiment 3.

FIG. 7 is a side view showing an exemplary configuration of fuel cell powered vehicle 800 according to this embodiment.

Fuel cell powered vehicle 800 includes cabin 810, trunk 820, gas tank chamber 830, fuel tank 831, gas sensor 832, pipe 840, fuel cell chamber 850, fuel cell 851, gas sensor 852, motor chamber 860, and motor 861.

Fuel tank 831 is provided in gas tank chamber 830, and holds hydrogen gas as the fuel gas. Gas sensor 832 detects a fuel gas leak in gas tank chamber 830.

Fuel cell 851 includes a fuel cell stack in which a plurality of cells used as the basic unit including a fuel electrode, an air electrode, and an electrolyte are stacked. Fuel cell 851 is provided in fuel cell chamber 850. Hydrogen gas in fuel tank 831 is sent into fuel cell 851 in fuel cell chamber 850 through pipe 840. Electricity is generated by making this hydrogen gas and oxygen gas in the atmosphere react within fuel cell 851. Gas sensor 852 detects a hydrogen gas leak in fuel cell chamber 850.

Motor 861 is provided in motor chamber 860. Fuel cell powered vehicle 800 runs by rotating motor 861 with the electricity generated by fuel cell 851.

As described above, in the gas sensor according to the present disclosure, the hydrogen containing gas can be detected with a very small power consumption of about 0.1 mW, as an example. Therefore, it is possible to constantly monitor a hydrogen gas leak by utilizing the excellent power-saving property of the gas sensor, without significantly increasing the standby electricity for a fuel cell powered vehicle.

For example, irrespective of the operation state of an ignition key in fuel cell powered vehicle 800, whether or not the hydrogen gas exists in the outside of fuel tank 831 in gas tank chamber 830, and in the outside of fuel cell 851 in fuel cell chamber 850 may be determined based on the current amount that flows into gas sensors 832 and 852, by constantly applying a predetermined voltage to gas sensors 832 and 852.

In this manner, whether or not there is a hydrogen gas leak has already been determined at the time when, for example, the ignition key is operated. Therefore, compared with the case where a gas sensor is driven for determining whether or not there is a hydrogen gas leak after the ignition key is operated, it is possible to shorten the start time of the fuel cell powered vehicle. Additionally, after the fuel cell powered vehicle travels, for example, even after the fuel cell powered vehicle is parked in a garage, the safety can be improved by continuing monitoring of a hydrogen gas leak.

In the above, the gas sensors, the hydrogen gas detection method, and the fuel cell powered vehicle according to some aspects of the present disclosure have been described based on the embodiments. However, the present disclosure is not limited to these embodiments. The embodiments to which various modifications that a person skilled in the art conceives are applied, and embodiments obtained by combining components in each of the embodiments may be included within the scope of the present disclosure, unless these embodiments depart from the spirit of the present disclosure.

For example, the above-described gas sensor may further include a measuring circuit that measures the current flowing into the gas sensitive resistance film, when a predetermined voltage is applied between the first electrode and the second electrode. Additionally, the gas sensor may further include a power supply circuit that constantly applies a predetermined voltage between the first electrode and the second electrode.

According to such a configuration, it is possible to obtain a highly useful gas sensor as a modular component that includes the measuring circuit or the power supply circuit.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The gas sensors according to the present disclosure are useful as gas sensors excellent in power-saving property.

The gas sensors according to the present disclosure are useful as hydrogen sensors used for, for example, a fuel cell powered vehicle, etc.

What is claimed is:

1. A gas sensor that detects molecules of a gas, the gas sensor comprising:
   a first electrode;
   a metal oxide layer on the first electrode, the metal oxide layer having a resistance value that changes when the metal oxide layer contacts hydrogen atoms;
   a second electrode on the metal oxide layer; and
   an insulating film that covers at least a part of side surfaces of the first electrode, the metal oxide layer, and the second electrode,
   wherein, in the metal oxide layer, a part of at least one of a first interface between the first electrode and the metal oxide layer, and a second interface between the second electrode and the metal oxide layer is not covered by the insulating film and is exposed to the gas.

2. The gas sensor according to claim 1,
   wherein the metal oxide layer includes an oxygen-deficient metal oxide.

3. The gas sensor according to claim 1,
   wherein at least a part of the metal oxide layer includes an oxygen-deficient area in which oxygen atoms are deficient.

4. The gas sensor according to claim 3,
   wherein the oxygen-deficient area is an amorphized area including a same material as at least one of the first electrode and the second electrode.

5. The gas sensor according to claim 1,
   wherein at least a part of the metal oxide layer includes a local area.

6. The gas sensor according to claim 5,
   wherein at least a part of the local area contacts at least one of the first electrode and the second electrode.

7. The gas sensor according to claim 1,
   wherein at least one of the first electrode and the second electrode includes a protrusion that projects toward the metal oxide layer in an interface between the metal oxide layer and the at least one of the first electrode and the second electrode.

8. The gas sensor according to claim 7,
   wherein the metal oxide layer includes an electric field concentration region in which an electric field is concentrated in a vicinity of a location at which the protrusion is arranged.

9. The gas sensor according to claim 1,
   wherein at least one of the first electrode and the second electrode includes a material having a catalytic action that dissociates the hydrogen atoms from the gas molecules.

10. The gas sensor according to claim 1,
    wherein at least one of the first electrode and the second electrode includes at least one material selected from the group consisting of platinum, palladium, and an alloy of platinum and palladium.

11. The gas sensor according to claim 1,
    wherein at least a part of a side surface of the second electrode among the side surfaces of the first electrode, the second electrode, and the metal oxide layer is not covered by the insulating film and is exposed.

12. The gas sensor according to claim 1,
    wherein the metal oxide layer contains at least one material selected from the group consisting of a transition metal capable of being in a plurality of oxidation states, tin, and aluminum.

13. The gas sensor according to claim 12,
wherein the transition metal is at least one of tantalum (Ta), hafnium (Hf), titanium (Ti), zirconium (Zr), niobium (Nb), tungsten (W), nickel (Ni), iron (Fe), chromium (Cr), cobalt (Co), manganese (Mn), vanadium (V), cerium (Ce), and copper (Cu).

14. The gas sensor according to claim 1,
wherein the metal oxide layer reversibly shifts between a high resistance state and a low resistance state based on a voltage applied between the first electrode and the second electrode.

15. A gas detection apparatus, comprising:
the gas sensor according to claim 1; and
a current measurement circuit that measures a current flowing into the metal oxide layer when a voltage is applied between the first electrode and the second electrode.

16. A gas detection apparatus, comprising:
the gas sensor according to claim 1; and
a power supply circuit that applies a voltage between the first electrode and the second electrode.

17. A fuel cell powered vehicle, comprising:
a cabin;
a gas tank chamber in which a tank for hydrogen gas is arranged;
a fuel cell chamber in which a fuel cell is arranged; and
the gas sensor according to claim 1,
wherein the gas sensor is arranged in at least one of the gas tank chamber and the fuel cell chamber.

18. A manufacturing method of a gas sensor that detects molecules of a gas, the manufacturing method comprising:
forming a first electrode;
forming, on the first electrode, a metal oxide layer having a resistance value that changes when the metal oxide layer contacts hydrogen atoms;
forming a second electrode on the metal oxide layer;
forming an insulating film that covers at least a part of side surfaces of the first electrode, the metal oxide layer, and the second electrode; and
forming, in at least a part of the insulating film and the second electrode, an opening that is recessed in a laminating direction of the insulating film, the second electrode, the metal oxide layer, and the first electrode, to expose at least a part of a first interface between the second electrode and the metal oxide layer.

19. The manufacturing method of the gas sensor according to claim 18,
wherein, in the forming of the opening, at least a part of the insulating film, the second electrode, and the metal oxide layer is opened to be recessed in the laminating direction of the insulating film, the second electrode, the metal oxide layer, and the first electrode, to expose a part of a second interface between the first electrode and the metal oxide layer.

* * * * *